Sept. 11, 1956
A. C. KISH
2,762,534
DEVICE FOR TAPPING A BARREL AND
REMOVING A LIQUID THEREFROM
Filed Nov. 10, 1951
5 Sheets-Sheet 1
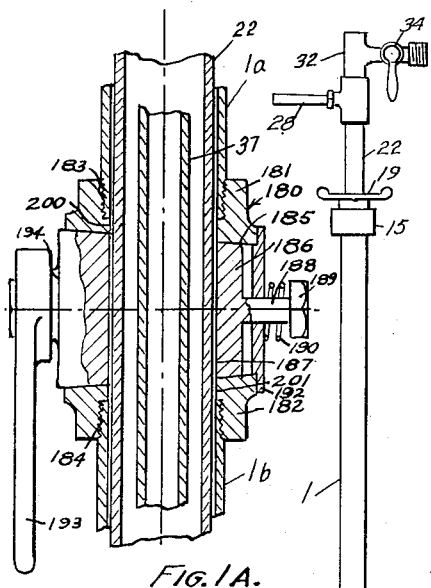
FIG. 1A.
FIG. 1.
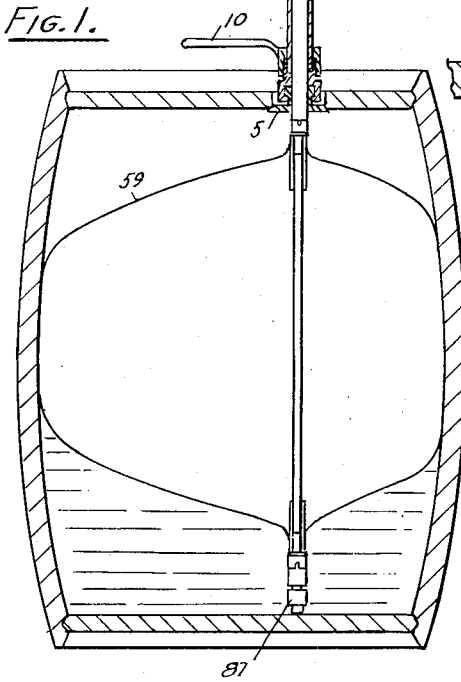
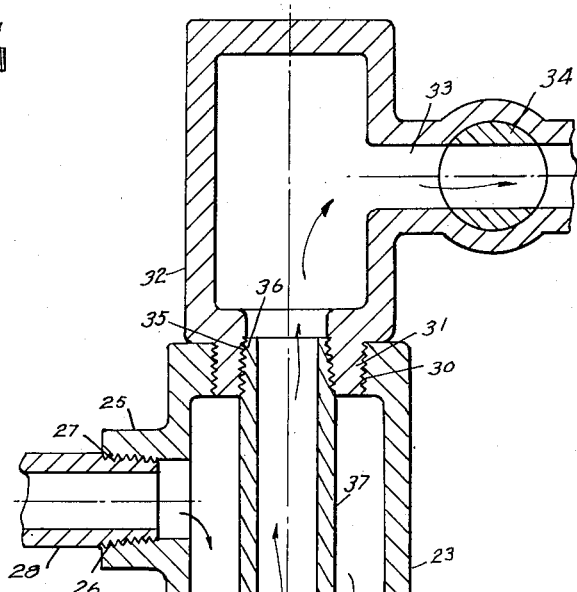
FIG. 2.
INVENTOR
ARNOLD C. KISH
BY Florian G. Miller
Atty.

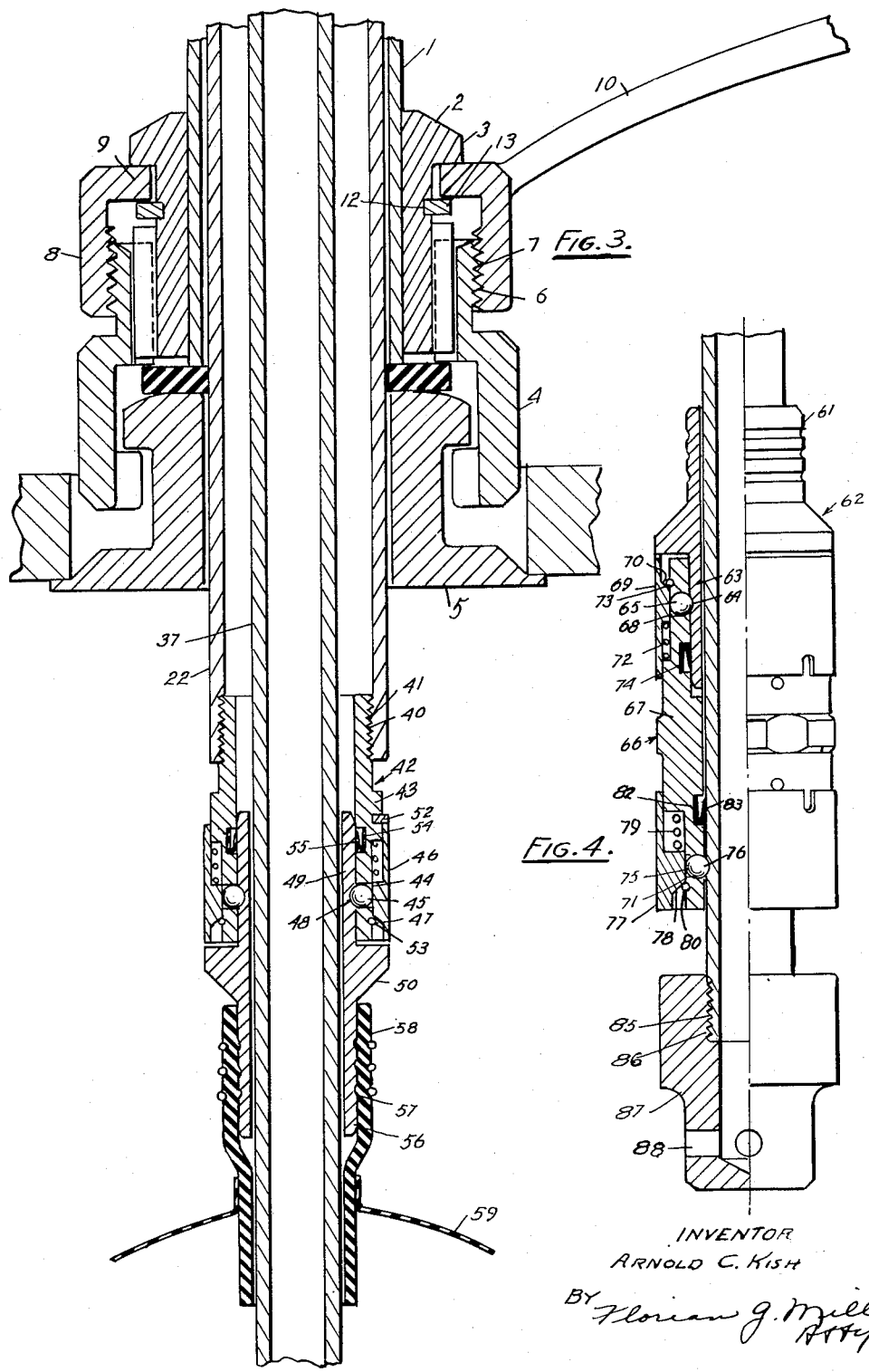

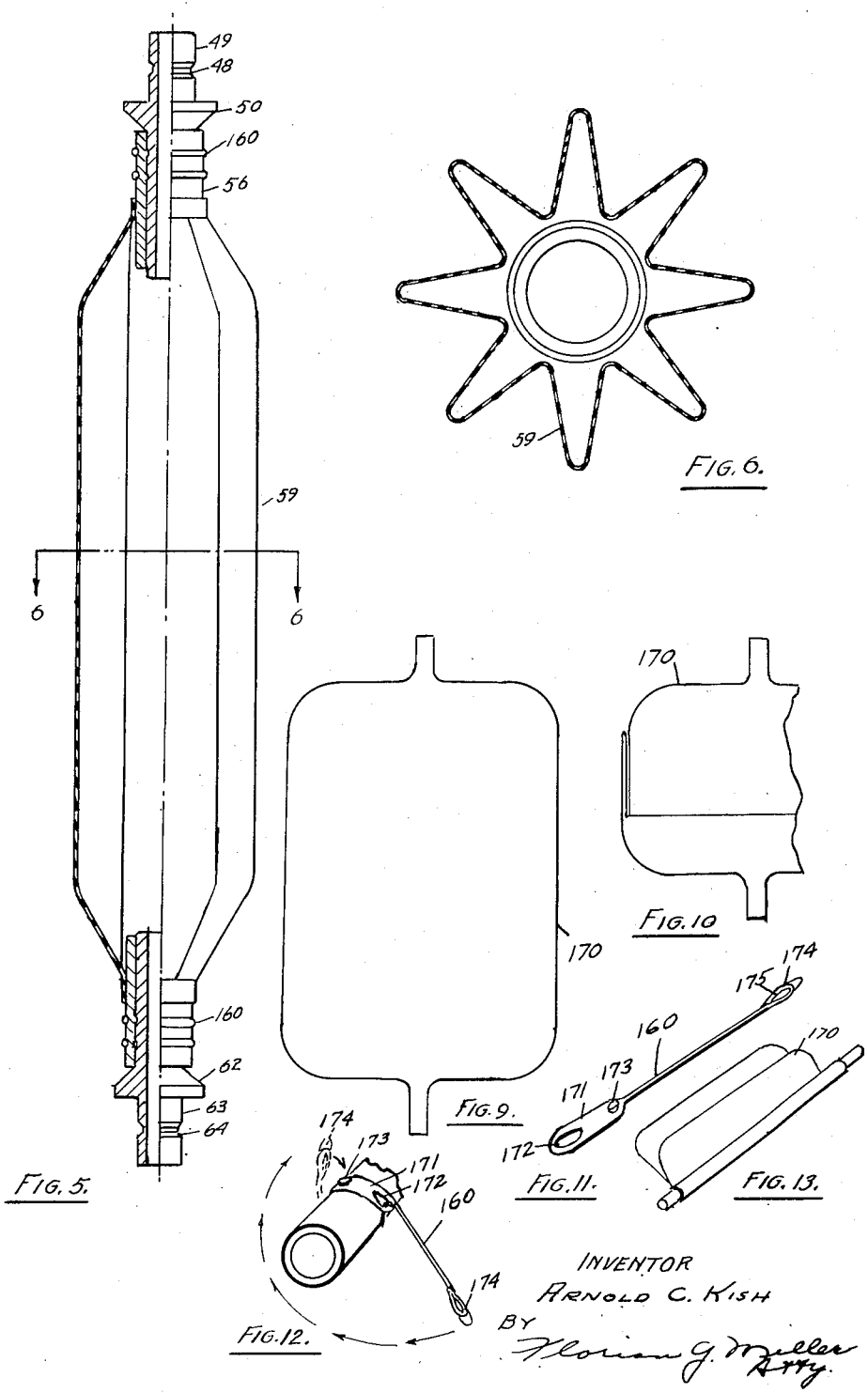

Sept. 11, 1956

A. C. KISH 2,762,534

DEVICE FOR TAPPING A BARREL AND
REMOVING A LIQUID THEREFROM

Filed Nov. 10, 1951

INVENTOR.
ARNOLD C. KISH
BY
Florian G. Miller
Atty.

United States Patent Office 2,762,534
Patented Sept. 11, 1956

2,762,534

DEVICE FOR TAPPING A BARREL AND REMOVING A LIQUID THEREFROM

Arnold C. Kish, Erie, Pa.

Application November 10, 1951, Serial No. 255,782

5 Claims. (Cl. 222—386.5)

This invention relates generally to a barrel tapping device and more particularly to novel means for tapping a conventional beer barrel and forcing the beer therefrom to a dispenser or tap without passing any form of fluid into contact with the beer, thereby preserving the quality and taste of the beer therein.

It is now the custom to tap a barrel of beer and then pass air under pressure into the barrel to force the beer from the barrel to a dispensing tap. This air which is passed into the barrel gradually mixes with the carbonic acid gas in the beer with the result that the carbonic acid gas in the beer is diluted and the beer becomes flat and tasteless. This is evident by the lack of foam normally appearing on the top of a glass of beer and it changes from a sparkling beverage to one that is flat and tasteless. Air sometimes has other noxious gases mixed therewith, thereby changing the taste of the beverage upon which is comes in contact. Where carbonic acid gas has been used instead of air to force beer out of the barrels, the carbonic gas is added to the gas already in the beer in the keg, thereby greatly increasing the carbonic acid gas in the beer with the result that the beer becomes wild and there is a bitter acid taste to the beer. None of the prior methods have been satisfactory in preserving a beverage, such as beer, for several hours or over night.

It is, accordingly an object of my invention to overcome the above and other defects in present beer tapping devices and it is more particularly an object of my invention to provide a beer tapping device which is simple in construction, economical in cost, economical in manufacture, easy to install, and efficient in operation.

Another object of my invention is to provide a beer tapping device which preserves the balance between the carbonic acid gas and the other ingredients in beer, thereby preserving the taste and flavor of the beer.

Another object of my invention is to provide a barrel tapping device which permits a beverage to be withdrawn from the same aperture into which a fluid or gas is passed to force the beverage out of the barrel.

Another object of my invention is to provide a barrel tapping device utilizing an inflatable member to force a beverage from a barrel and novel attaching means therefor.

Another object of my invention is to provide novel means in a barrel tapping device for attaching an inflatable member and passing it to the inside of a barrel to force a beverage therefrom.

Another object of my invention is to provide a novel barrel tapping device having novel means for inserting an inflatable member into the barrel.

Other objects of my invention will become evident from the following detailed description, taken in conjunction with the accompanying drawings, in which:

Fig. 1 is a side elevational view partly in section showing my novel barrel tapping device with an inflatable member partially inflated inside of a barrel;

Fig. 1a is a fragmentary sectional view showing an additional valve in my novel barrel tapping device;

Fig. 2 is a fragmentary vertical sectional view of the upper end of my novel barrel tapping device;

Fig. 3 is a fragmentary enlarged vertical sectional view of the means for attaching the upper end of the inflatable member of my novel barrel tapping device to the tapping rod and also showing the means for attaching the device to a conventional coupling member on a conventional beer keg;

Fig. 4 is a side elevational view of the novel coupling member used on the lower end of the beer rod for attaching the lower end of the inflatable member to the drill rod;

Fig. 5 is a side elevational view of my novel inflatable member made of an elastic material for stretching on the beer rod of my novel barrel tapping device;

Fig. 6 is a view taken on the line 6—6 of Fig. 5;

Fig. 9 is a side elevational view of an inflatable member made of a material such as a plastic which has very little elasticity;

Fig. 10 is a fragmentary side elevational view of the inflatable member shown in Fig. 9 folded longitudinally thereof;

Figs. 11 and 12 are perspective views of an elastic fastening device for fastening the ends of an inflatable member to a beer rod; and Fig. 13 is a perspective view of the inflatable member shown in Fig. 9 partially rolled normal to the axis thereof for disposal on a beer rod.

Figure 7:
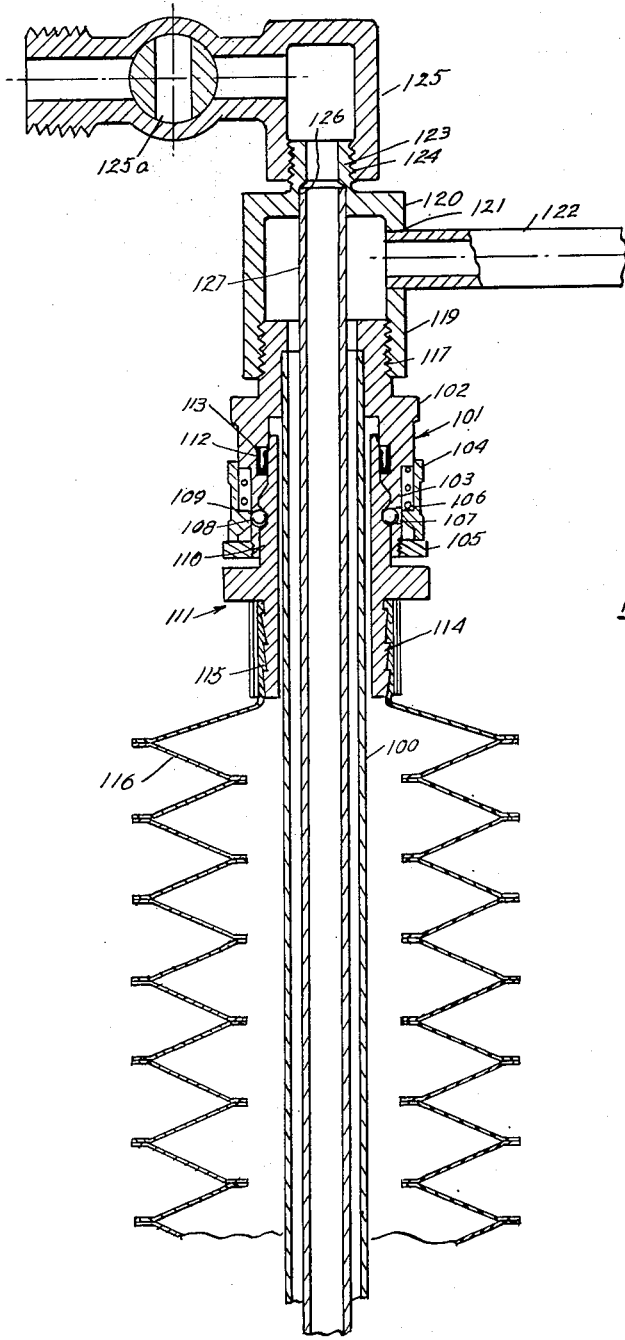
Fig. 7 is a vertical sectional view of the upper end of a modified form of my novel beer barrel tapping device.

Referring now to the drawings, I show in Figs. 1 to 6 inclusive a tubular member 1 having a sleeve 2 with an outwardly extending flange 3 on the upper end thereof secured to the lower end thereof. A female member 4 of a bayonet type coupling is slidably engaged with the member 2 but held against rotation relative thereto. The female member 4 is adapted to engage a conventional male bayonet type coupling member 5 disposed on the conventional beer barrel now distributed by breweries throughout the United States. The member 4 has an externally threaded portion 6 threadably engaging the internal thread 7 of a locking sleeve 8, the locking sleeve 8 having an inwardly directed flange 9 engaging the underside of the flange 3 on the sleeve 2. The locking sleeve 8 also has a radially outwardly extending handle 10 for rotating the locking sleeve 8 to a locked position. The sleeve 2 has a peripheral groove 12 in which a clip 13 is disposed to limit the longitudinal axial movement of the inwardly directed flange 9 of the locking sleeve 8. The upper end of the member 1 has a sleeve 15 attached thereto by welding at 16, the sleeve 15 having a threaded internal portion 17 for threadably engaging the lower threaded end 18 of a gland 19 for forcing a sealing member 20 into sealing engagement with a sleeve 22 telescopically disposed and axially movable in the member 1. The sleeve 22 has a cylindrical member 23 welded at 24 to the upper end thereof, the member 23 having a laterally extending, apertured bossed portion 25 with a conventional pipe thread 26 for receiving the threaded end 27 of a pipe 28 to provide a suitable source of air or other suitable fluid. The upper end of the cylindrical member 23 is internally threaded at 30 for receiving the lower threaded end 31 of a cylindrical head 32 having a laterally extending outlet 33 in which is disposed a conventional valve 34 for controlling the flow of fluid from the head 32. The head 32 also has an internally threaded portion 35 for threadable engagement with the upper threaded end 36 of a drill or beer rod 37 which is disposed concentric to the sleeve 22 and spaced therefrom so as to provide a passageway for gas, air, or other fluid therebetween. The above members are shown particularly in Figs. 1 and 2.

The beer rod 37 is movable with the sleeve 22 relative to the member 1. It extends a sufficient distance beyond the lower end of the sleeve 22 to reach substantially to the bottom of a conventional beer barrel to be tapped. The sleeve 22 has an internally threaded portion 40 on the lower end thereof for threadable engagement with the threaded end 41 of a female coupling member 42. The female coupling member 42 comprises a tubular shell 43 with circumferentially spaced, radially extending apertures 44 for carrying balls or other camming members 45 and a locking sleeve 46 telescopically disposed on the shell 43 with a camming surface 47 for urging the balls 45 into locking engagement with the peripheral groove 48 on the connecting portion 49 of a male coupling member 50. The shell 43 of the female coupling member 42 carries annular clips 52 and 53 for limiting the longitudinal movement of the locking sleeve 46. It also has an internal annular grove 54 for carrying a conventional annular washer 55 to sealingly engage the connecting portion 49 of the male member 50. The male member 50 has a projecting portion 56 with spaced projections 57 to frictionally engage the end 58 of an inflatable member 59 shown particularly in Figs. 5 and 6. The male member 50 is slidable on the rod 37.

The lower end of the inflatable member 59 (Fig. 4) is connected to the grooved connecting portion 61 of a male coupling member 62 slidable on the rod 37 longitudinally. The male member 62 has a connecting portion 63 with a peripheral groove 64, the groove 64 being engageable by the balls or camming members 65 carried by a female coupling member 66. The female coupling member 66 comprises a tubular shell 67 having circumferentially spaced, radially extending apertures 68 for carrying the balls 65, and a locking sleeve 69 telescopically disposed on the shell 67 and having a camming portion 70 urged against the balls 65 by a coil spring 72. An annular stop clip 73 limits the longitudinal movement of the locking sleeve 69. The shell 67 carries an internal annular washer 74 for sealingly engaging the connecting end 63 of the male member 62. The opposite end of the shell 67 has circumferentially spaced, radially extending apertures 71 carrying camming or ball members 75 for lockingly engaging an annular peripheral groove 76 in the beer rod 37. The camming members 75 are urged into locking relationship with the groove 76 by a camming sleeve 77 having a camming portion 78 urged against the balls 75 by a coil spring 79. An annular stop clip 80 limits the longitudinal movement of the locking sleeve 77 on the end of the shell 67. The shell 67 has an internal groove 82 carrying an annular washer 83 for sealingly engaging the beer rod 37. The lower end of the beer rod 37 is threaded at 85 for threadably engaging the internally threaded portion 86 of a lower head member 87 having a laterally extending aperture 88 to provide a passage for beer from the barrel to pass it upwardly through the beer rod 37.

In the operation of my novel barrel tapping device, a rubber balloon or other inflatable member 59 has one end thereof connected to the connecting portion 56 of the male coupling member 50 and the opposite end thereof connected to the connecting portion 61 of the male coupling member 62 by any suitable means. The male coupling member 50 is then slid along the beer rod 37 and it is connected to the female coupling member 42 connected to the sleeve 22, the balls 45 carried by the female coupling member 42, being urged into locking relationship with the groove 48 on the connecting portion 49 of the male member 50 by locking sleeve 46. The female coupling member 66 is then connected to the lower end of the beer rod 37, the balls 75 being urged into locking relationship with the peripheral groove 76 in the periphery of the rod 37 by the camming portion 78 on the locking sleeve 77, the locking sleeve 77 being spring urged by the coil spring 79. The male member 62 is then pulled longitudinally of the rod 37 to stretch the inflatable member 59 longitudinally at which time the male member 62 having a connecting portion 63 is connected to the female member 66 by balls 65 which are urged into locking engagement with the peripheral groove 64 of the portion 63 of the male member 62 by the spring urged locking sleeve 69 on the female member 66.

The female member 4 is then connected to the male member 5 forming a part of the conventional beer barrel and the handle 10 is then rotated so as to make a tight connection between the female member 4 and the male member 5. The sleeve 22 and rod 37 connected thereto are then driven longitudinally of the member 1 by tapping the top of the head 32 whereby the cork bung normally disposed in the aperture in the male coupling member in the barrel is driven out into the barrel and the sleeve 22 and rod 37 are moved longitudinally of the member 1 until the lower head member 87 on the lower end of the rod 37 is disposed adjacent the bottom of the barrel. At this point, the gland 19 is rotated so that the sealing member 20 is compressed against the outer side of the sleeve 22 into sealing relationship therewith. The threaded end of the cock 34 is then connected to a conduit leading to a dispenser at a bar or the like and the conduit 28 is connected to a source of air or other fluid. Air is then admitted to the conduit 28, the passageway between the rod 37 and the sleeve 22, and the passageway between the female and male coupling members 42 and 50 and the rod 37 to the inflatable member 59 which is thereby inflated to force the beverage in the barrel outwardly through the outwardly extending aperture 88 in the member 87 on the lower end of the rod 37 upwardly through the rod 37 to a dispenser, the cock 34 controlling the flow of beverage from the barrel. A given pressure of air is admitted to the inflatable member 59 so that there is always a given amount of pressure on the beverage in the barrel. The inflatable member 59 is adapted to fill the entire barrel so as to force all of the beverage in the barrel upwardly through the rod 37.

Figure 8:
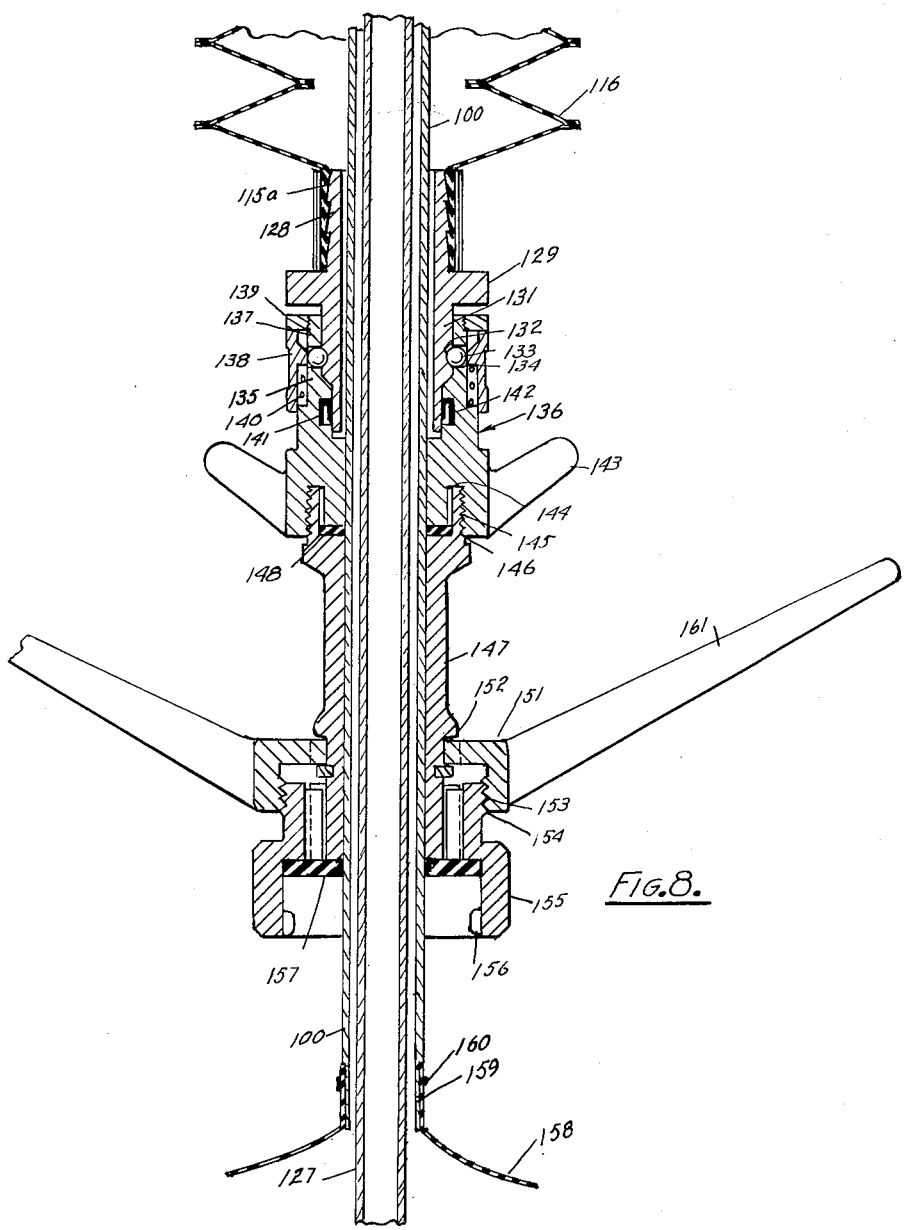
Fig. 8 is a vertical sectional view of the lower end of the modified form of my invention shown in Fig. 7.

Referring now to Figs. 7 and 8 which is a modified form of my invention, I show a cylindrical sleeve 100 having a female coupling member 101 attached to the upper end thereof. The female coupling member 101 comprises a cylindrical shell 102 having an offset portion 103 for receiving a telescoping locking sleeve 104 urged against a stop collar 105 by a coil spring 106. The cylindrical shell 102 also has radially extending apertures 107 for receiving locking balls 108, the locking balls 108 being urged to locking engagement with a peripheral groove 109 on the connecting portion 110 of a male coupling member 111 surrounding and slidable on the sleeve 100. The shell 102 has an internal groove 112 for receiving a U-shaped washer 113 for sealing the end of the connecting portion 110 of the male member 111. The male member 111 has a serrated connecting portion 114 for connection to the upper tubular end 115 of a flexible, longitudinally collapsible, telescoping member 116 surrounding the sleeve 100.

The upper end of the shell 102 is externally threaded at 117 for threadably engaging the internally threaded portion 119 of an inverted cup shaped member 120. The inverted cup shaped member 120 has a laterally extending aperture 121 with a pipe line 122 leading therefrom for receiving air or the like for passage into the member 120. The upper end 123 of the member 120 is reduced and externally threaded for threadably engaging the internal threaded portion 124 of a head 125. The head 125 has a valve 125a therein. The end 123 of the member 120 has a seating portion 126 for receiving the upper end of a beer rod 127 which extends concentrically of the female coupling member 101, the male coupling member 111, and the sleeve 100.

The lower end 115a of the bellows like, telescoping yieldable member 116 shown in Fig. 7 is attached to the serrated connecting end 128 of a male coupling member 129 surrounding the sleeve 100 and slidable thereon. The male coupling member 129 has a connecting portion 131 with a peripheral groove 132 which is lockingly engaged by balls 133 carried in radially extending apertures 134 in the shell 135 of a female coupling member 136. The shell 135 has a reduced portion 137 for telescopically receiving a locking sleeve 138 which is urged against a stop collar 139 by a coil spring 140. The shell 135 has an internal washer groove 141 for receiving a U-shaped washer 142 for sealing the end of the male coupling member 129.

The female coupling member 136 has outwardly extending gripping members 143 and it has an annular recess 144 threaded at 145 for threadably engaging the upper threaded end 146 of a tubular body 147. A sealing washer 148 is disposed between the female member 136 and the upper end of the body 147. An inverted, cup shaped member 151 with handles 161 has a portion thereof disposed in a peripheral groove 152 on the body 147 and it has internal threads 153 for threadably engaging the upper threaded end 154 of a cylindrical coupling member 155 having inwardly extending, circumferentially spaced projections 156 for cooperating with conventional spaced projections on a conventional beer barrel to form a bayonet connection. Any suitable washer 157 may be provided in the member 155. A balloon 158 or other inflatable member is connected to the reduced bottom 159 of the cylindrical sleeve 100 by rubber bands 160 shown in Figs. 11 and 12 or they may be connected to the beer rod 37 by connections as shown in Fig. 1.

It will be observed that in my novel modification, the longitudinally extending elements of my novel beer tapping device are materially shortened and lightened while still providing the same results in that none of the air of gases come in contact with the beer, the gist of my invention being the provision of the inflatable member and means for passing air to the inflatable member to evacuate the beer in the barrel without any gases or air coming into contact with the beer in the barrel.

In the operation of my novel modified device shown in Figs. 7 and 8, the projecting members 156 on the coupling member 155 are lockingly engaged with mated members on the coupling on a conventional beer barrel by rotating the handles 161. The beer rod 127 with an inflatable member 158 attached thereto is then forced through the cork of the conventional beer barrel by hitting the head 125 with the palm of the hand whereby the lower end of the beer rod 127 with the balloon 158 attached thereto passes downwardly into the barrel to a position adjacent the bottom thereof at which point the beer rod 127 is locked by rotating the handles 143. During this operation, the member 116 telescopes longitudinally to a fully retracted position. Air under a suitable pressure is passed through the passageway 149 and the passageway 122 to the inflatable member 158 now disposed in the barrel whereby the inflatable member 158 will force the beer from the barrel out through the rod 127. Beer passes through the beer rod 127 outwardly through the head 125 on the upper end of my novel beer tapping device and it is controlled by the cock 125a.

It will be evident that as the beer rod 127 with the inflatable member 158 moves downwardly into the barrel, the flexible telescoping member 116 will collapse almost completely so that a very small portion of the upper end of my beer tapping apparatus will extend upwardly from the keg which is different from that shown in Figs. 1, 2, and 3 because of the outer sleeve 2 which is a solid piece.

In Figs. 9, 10, and 13, I show an inflatable member 170 which is made of a material such as polyethylene plastic and which has practically no elasticity. In this instance, I overlap the member 170 longitudinally in the center thereof as shown in Fig. 10 and then roll it upon its own axis as shown in Fig. 13 whereupon it is placed on the beer rod in a rolled position. After insertion into the barrel on a beer rod, the member 170 will unroll and it is inflated by air as has been heretofore described.

The rubber band 160 has been found more preferable in use than conventional rubber bands. The rubber band 160 has a flattened end 171 with an aperture 172 and a latching member 173 and the opposite end 174 apertured at 175. The end 174 passes through the aperture 172 in the end 171 as shown in Fig. 12 and the apertured end 174 is secured to the latching member 173.

In some instances, it is possible that the inflatable member may burst or otherwise become damaged at the time of the tapping of the barrel. In this case, it is necessary to remove the inflatable member immediately inasmuch as it would not function to remove the beer from the barrel and air or gas would be passing into direct contact with the beer in the barrel. In Fig. 1a, I show a means for removing a damaged inflatable member while holding air or gas under pressure in the barrel comprising a plug valve 180 having internally threaded flanges 181 and 182 on opposite sides thereof for threadable engagement with the threaded ends 183 and 184 of tubular members 1a and 1b which correspond to the outer tubular member 1 shown in Figs. 1, 2, and 3. The plug valve 180 is placed a few inches above the coupling connecting the barrel and the tapping device. The sleeve 22 and the beer rod 37 with the inflatable member 59 attached thereto are movable axially of the members 1a and 1b so that they can be withdrawn through the tubular members 1a and 1b and the valve 180 closed.

The plug valve 180 has a transversely extending tapered aperture 185 normal to apertures 200 and 201 axially aligned with the tubular members 1a and 1b. A tapered plug 186 is rotatably mounted in the tapered aperture 185 and it has a transversely extending aperture 187 adapted for alignment with the apertures 200 and 201 and with the tubular members 1a and 1b. The plug 186 has an outwardly extending shaft 188 with a head 189. A coil spring 190 surrounds the shaft 188 and it is disposed between the head 189 on the shaft 188 and a cap 192 disposed over the small end of the tapered aperture 185 in the valve 180. A lever 193 is disposed on an outwardly extending shaft 194 on the large end of the plug 186 for the rotation of same.

When the drill rod 37 with the inflatable member 59 attached thereto and the sleeve 22 is withdrawn, it is only necessary to rotate the handle 193 ninety degrees after the sleeve 22 and drill rod 37 clear the aperture 187 in the plug 186. A new inflatable member may, therefore, be attached to the drill rod 37 and extended into the barrel upon rotation of the handle 193 in a reverse direction to align the aperture 187 in the plug 186 with the tubular members 1a and 1b and the apertures 200 and 201 in the valve 180.

It will be evident from the foregoing description that my novel tapping device may be utilized with any conventional beer barrel now on the market with one opening therein and with a male member on a bayonet joint, one which supplies air to the one aperture in the keg and withdraws beverage through the same aperture, one in which air or other gases entering the keg to force beverage therefrom does not come into contact with the beverage in the keg, and one which preserves the beer in the keg in its original state so as to maintain its sparkle and taste.

Various changes may be made in the specific embodiment of my invention without departing from the spirit thereof or from the scope of the appended claims.

What I claim is:

1. A device for tapping a barrel comprising a tubular member, means for securing said tubular member to a coupling member on a barrel, a sleeve telescopically movable in said tubular member having an inlet on the upper end thereof, a hollow rod concentrically disposed in said tubular member, sealing means between the upper end of said tubular member and the outside of said rod, said rod and said sleeve defining a passageway therebetween, an inflatable member disposed around said rod, means to secure said inflatable member on the lower end of said rod and to said sleeve at the upper end of said inflatable member on said rod whereby a fluid tight enclosure is formed between said container and said rod, said inflatable member being adapted to be retracted with said rod into said tubular member in longitudinally tensioned condition prior to the insertion of said rod with said inflatable member thereon into a barrel to be tapped, and means to direct fluid into the space between said tubular member and said rod whereby fluid injected thereinto inflates said inflatable member and forces liquid from said barrel through said hollow rod.

2. A device for tapping a barrel and forcing the liquid therefrom comprising a tubular body member, means for securing said body member to a coupling member on a keg, a sleeve telescopically movable in said body member having an inlet on the upper end thereof, a hollow rod concentrically disposed in said sleeve, said rod and said sleeve defining a passageway therebetween, a valve on said rod for controlling the flow of fluid therethrough, means for sealingly engaging said body member and said sleeve, an inflatable member secured on the lower end of said rod, and means for detachably connecting opposite ends of said inflatable member, said sleeve holding said inflatable member in extended position, said inflatable member being in fluid flow relationship with said passageway and being inflated by a source of fluid through the inlet in said sleeve and said passageway, said means for detachably connecting opposite ends of said inflatable member comprising a male coupling member slidable on said rod at said lower end and connected at the opposite end to said sleeve, and female coupling members disposed in spaced relationship, one on said rod for connection to one said male member at the lower end of said rod, said other coupling member being attached to said sleeve at the upper end thereof said coupling members being smaller in diameter than the outside diameter of said sleeve.

3. A barrel tapping device comprising a tubular member, means for securing said tubular member to the coupling member on a conventional barrel a sleeve slidable in said tubular member having an inlet on the upper end thereof a hollow rod disposed concentrically of said sleeve defining a passage between said sleeve and said rod for admitting gas therethrough from the inlet in said sleeve, a valve connected to the upper end of said rod for controlling the flow of fluid passing therefrom, an inflatable member surrounding the lower end of said rod, coupling members connected to opposite ends of said inflatable member surrounding said rod, a coupling member connected to said sleeve for connecting the upper end of said inflatable member, said coupling members having passageways for gas to pass to said inflatable member, a female coupling member on the lower end of said rod for connecting said coupling member on the other end of said inflatable member, said coupling members connecting opposite ends of said inflatable member comprising male coupling members concentric to said rod and connected to the opposite ends of said inflatable member and female coupling members disposed in spaced relationship concentric to said rod and one attached to said sleeve, the other attached to said rod, a peripheral groove in said male members, balls carried by said female members, and means to urge said balls into engagement with said grooves whereby said male coupling members are locked to said female coupling members, the largest lateral dimension of said coupling members being less than the outside diameter of said sleeve member.

4. A barrel tapping device for tapping a conventional beer barrel having a coupling member integral therewith comprising a tubular member, means for connecting said tubular member to said coupling member on said beer barrel, a sleeve telescopically disposed in said tubular member having an inlet for fluid on the upper end thereof, a beer rod disposed concentrically of said sleeve and movable therewith defining a passageway between said beer rod and said sleeve, a valve member on the upper end of said beer rod for controlling the flow of beer therefrom, a considerable portion of said beer rod extending outwardly from the lower end of said sleeve, an inflatable member surrounding the lower end of said beer rod, and coupling members for connecting the upper end of said inflatable member to said sleeve and the lower end of said inflatable member to said rod, the upper coupling member having longitudinally extending passageways for passing air or gas to said inflatable member from said inlet in said sleeve, said coupling members comprising male coupling members slidable on said rod connected to the opposite ends of said inflatable member and female coupling members disposed in spaced relationship, one on said rod and the other on said sleeve for connection to said male members, said coupling members being of lesser outside diameter than the outside diameter of said sleeve.

5. A barrel tapping device as set forth in claim 3 wherein the female coupling member on the lower end of said rod carries balls and a locking sleeve for lockingly engaging said female member in a predetermined position on said rod, said rod having a peripheral groove for engaging the balls on said femal coupling member.

References Cited in the file of this patent

UNITED STATES PATENTS

| | | |
|---|---|---|
| 1,977,862 | Scholtes | Oct. 23, 1934 |
| 2,283,100 | Shores | May 12, 1942 |

FOREIGN PATENTS

| | | |
|---|---|---|
| 10,746 | Great Britain | Oct. 3, 1912 |